United States Patent
Blackburn et al.

(10) Patent No.: US 11,360,276 B1
(45) Date of Patent: Jun. 14, 2022

(54) OPTOELECTRONIC ASSEMBLY FOR A COMMUNICATION SYSTEM

(71) Applicant: TE Connectivity Services GmbH, Schaffhausen (CH)

(72) Inventors: Christopher William Blackburn, Bothell, WA (US); Nathan Lincoln Tracy, Harrisburg, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 17/125,547

(22) Filed: Dec. 17, 2020

(51) Int. Cl.
*G02B 6/38* (2006.01)
*F21V 8/00* (2006.01)

(52) U.S. Cl.
CPC ......... *G02B 6/3869* (2013.01); *G02B 6/0083* (2013.01); *G02B 6/3894* (2013.01)

(58) Field of Classification Search
CPC ... G02B 6/3869; G02B 6/0083; G02B 6/3894
See application file for complete search history.

(56) References Cited

U.S. PATENT DOCUMENTS

| | | |
|---|---|---|
| 10,811,800 B1 | 10/2020 | Blackburn et al. |
| 10,856,432 B1 | 12/2020 | Blackburn et al. |
| 10,877,217 B2 * | 12/2020 | Byrd ..................... G02B 6/428 |
| 10,942,324 B2 * | 3/2021 | Evans .................. G02B 6/4274 |
| 11,081,821 B2 | 8/2021 | Blackburn et al. |
| 11,109,515 B1 * | 8/2021 | Nagarajan .......... H05K 7/20672 |
| 11,129,290 B2 * | 9/2021 | Costello ................. H05K 3/301 |
| 2020/0388548 A1 | 12/2020 | Blackburn et al. |
| 2021/0274673 A1 | 9/2021 | Blackburn et al. |

\* cited by examiner

*Primary Examiner* — John Bedtelyon (57) ABSTRACT

An optoelectronic assembly includes an optical module assembly including a fiber optic connector and an optical engine on an optical engine substrate. The fiber optic connector has a ferrule holding optical fibers optically coupled to the optical engine. The optical engine substrate includes a contact array of optical engine contacts at a bottom of the optical engine substrate. The optical module assembly includes a heat transfer element thermally coupled to the optical engine. The optical module assembly includes a backshell configured to be coupled to a circuit board. The backshell holds the heat transfer element in thermal contact with the optical engine. The optoelectronic assembly includes an interposer assembly electrically connected to the contact array of optical engine contacts having compressible interposer contacts with separable mating interfaces.

20 Claims, 8 Drawing Sheets

OPTOELECTRONIC ASSEMBLY FOR A COMMUNICATION SYSTEM

BACKGROUND OF THE INVENTION

The subject matter herein relates generally to communication systems.

There is an ongoing trend toward smaller, lighter, and higher performance communication components and higher density systems, such as for ethernet switches or other system components. Typically, the system includes an electronic package coupled to a circuit board, such as through a socket connector. Electrical signals are routed between the electronic package and the circuit board. The electrical signals are then routed along traces on the circuit board to another component, such as a transceiver connector. The long electrical paths through the host circuit board reduce electrical performance of the system. Additionally, losses are experienced between the connector interfaces and along the electrical signal paths of the transceivers. Conventional systems are struggling with meeting signal and power output from the electronic package.

A need remains for a reliable communication system.

BRIEF DESCRIPTION OF THE INVENTION

In one embodiment, an optoelectronic assembly is provided. The optoelectronic assembly includes an optical module assembly including a fiber optic connector and an optical engine on an optical engine substrate. The fiber optic connector has a ferrule holding at least one optical fiber optically coupled to the optical engine. The optical engine substrate includes a contact array of optical engine contacts at a bottom of the optical engine substrate. The optical engine contacts are coupled to the optical engine. The optical module assembly includes a heat transfer element thermally coupled to the optical engine. The optical module assembly includes a backshell configured to be coupled to a circuit board. The backshell includes a cavity holding the heat transfer element, the optical engine, and the optical engine substrate. The backshell holds the heat transfer element in thermal contact with the optical engine. The optoelectronic assembly includes an interposer assembly electrically connected to the contact array of optical engine contacts. The interposer assembly includes an array of interposer contacts. The interposer contacts are compressible. Each interposer contact has an upper mating interface and a lower mating interface. The optoelectronic assembly includes separable mating interfaces electrically connected to the corresponding optical engine contacts. The lower mating interfaces of the interposer contacts are configured to be electrically connected to the circuit board.

In another embodiment an optoelectronic assembly is provided. The optoelectronic assembly includes a circuit board having board contacts at a mounting area on an upper surface of the circuit board. The mounting area has alignment openings. The optoelectronic assembly includes an interposer assembly coupled to the circuit board at the mounting area. The interposer assembly includes an array of interposer contacts held together by a support plate. The support plate and the interposer contacts are held by an interposer frame. The interposer frame includes locating pins received in the alignment openings to align the interposer assembly with the circuit board. The interposer contacts are compressible. Each interposer contact has an upper mating interface and a lower mating interface. The upper mating interfaces defining separable mating interfaces. The lower mating interfaces of the interposer contacts are electrically connected to the corresponding board contacts of the circuit board. The optoelectronic assembly includes an optical module assembly coupled to the interposer assembly. The optical module assembly includes a fiber optic connector and an optical engine on an optical engine substrate. The fiber optic connector has a ferrule holding at least one optical fiber optically coupled to the optical engine. The optical engine substrate includes a contact array of optical engine contacts at a bottom of the optical engine substrate. The optical engine contacts are coupled to the optical engine. The optical engine contacts are coupled to the corresponding interposer contacts at a separable mating interface. The optical module assembly includes a heat transfer element thermally coupled to the optical engine. The optical module assembly includes a backshell coupled to the circuit board. The backshell includes a cavity holding the heat transfer element, the optical engine, and the optical engine substrate. The backshell holds the heat transfer element in thermal contact with the optical engine.

In a further embodiment, a communication system is provided. The communication system includes a circuit board having an electronic package on the circuit board. The electronic package is electrically connected to the circuit board. The circuit board has mounting areas on an upper surface of the circuit board adjacent the electronic package. Each mounting area includes board contacts. The mounting area has alignment openings. The mounting area has mounting openings. The communication system includes interposer assemblies coupled to the circuit board at the corresponding mounting areas. Each interposer assembly includes an array of interposer contacts held together by a support plate. The support plate and the interposer contacts are held by an interposer frame. The interposer frame includes locating pins received in the alignment openings to align the interposer assembly with the circuit board. The interposer contacts are compressible. Each interposer contact has an upper mating interface and a lower mating interface. The upper mating interfaces define separable mating interfaces. The lower mating interfaces of the interposer contacts are electrically connected to the corresponding board contacts of the circuit board. The communication system includes optical module assemblies coupled to the corresponding interposer assemblies. Each optical module assembly includes a fiber optic connector and an optical engine on an optical engine substrate. The fiber optic connector has a ferrule holding at least one optical fiber optically coupled to the optical engine. The optical engine substrate includes a contact array of optical engine contacts at a bottom of the optical engine substrate. The optical engine contacts are coupled to the optical engine. The optical engine contacts are coupled to the corresponding interposer contacts at a separable mating interface. The optical module assembly includes a heat transfer element thermally coupled to the optical engine. The optical module assembly includes a backshell coupled to the circuit board using compression hardware received in the corresponding mounting openings. The backshell includes a cavity holding the heat transfer element, the optical engine, and the optical engine substrate. The backshell holding the heat transfer element in thermal contact with the optical engine.

DETAILED DESCRIPTION OF THE INVENTION

Figure 1:
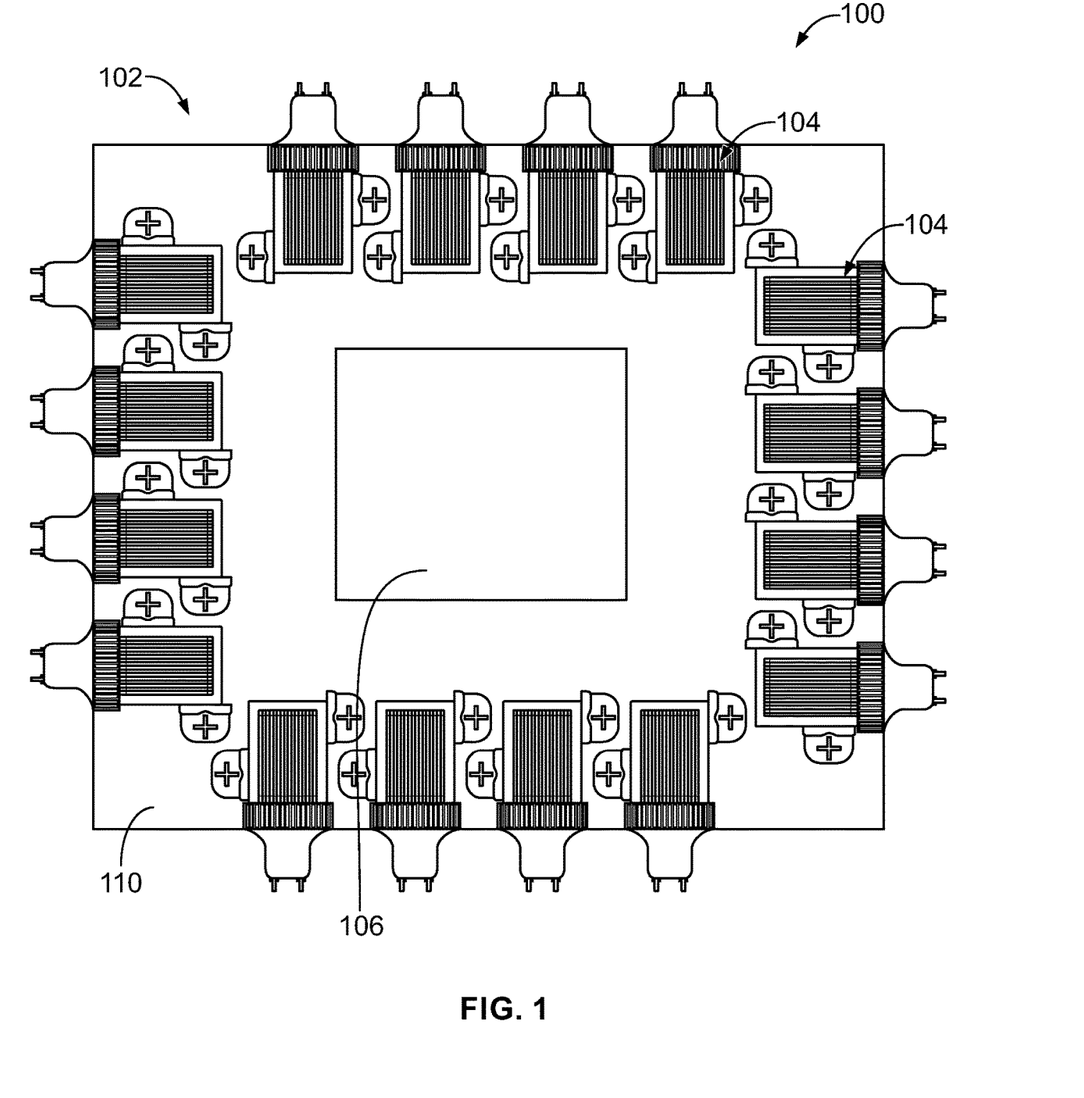
FIG. 1 is a top view of a communication system having an optoelectronic assembly in accordance with an exemplary embodiment.

FIG. 1 is a top view of a communication system 100 having an optoelectronic assembly 102 in accordance with an exemplary embodiment. The optoelectronic assembly 102 includes one or more optical module assemblies 104 electrically connected to a circuit board 110 by interposer assemblies 108 (shown in FIG. 2). An electronic package 106 is electrically connected to the circuit board 110. In an exemplary embodiment, compression hardware is used to load the optical module assemblies 104 against the interposer assemblies 108 to electrically connect the optical module assemblies 104 to the interposer assemblies 108 and to electrically connect the interposer assemblies 108 to the circuit board 110. For example, compression hardware, such as spring loaded threaded fasteners, may be coupled to bolster plates or other support structures below the circuit board 110. In an exemplary embodiment, the communication system 100 includes a heat sink (not shown) provided to dissipate heat from the electronic package 106 and/or the optical module assemblies 104.

In various embodiments, the electronic package 106 may be an integrated circuit assembly, such as an ASIC. However, the electronic package 106 may be another type of communication component. The electronic package 106 may be mounted to a host circuit board, such as the circuit board 110. In other various embodiments, the circuit board 110 may be a package substrate, which may be coupled to a host circuit board (not shown). Optionally, the optical module assemblies 104 may be provided on multiple sides of the circuit board 110. In the illustrated embodiment, the optical module assemblies 104 are provided on multiple sides of the electronic package 106, such as on all four sides of the electronic package 106. Other arrangements are possible in alternative embodiments. In various embodiments, the optical module assemblies 104 are individually clamped or compressed against the interposer assemblies 108 and are thus individually serviceable and removable from the circuit board 110.

Figure 2:
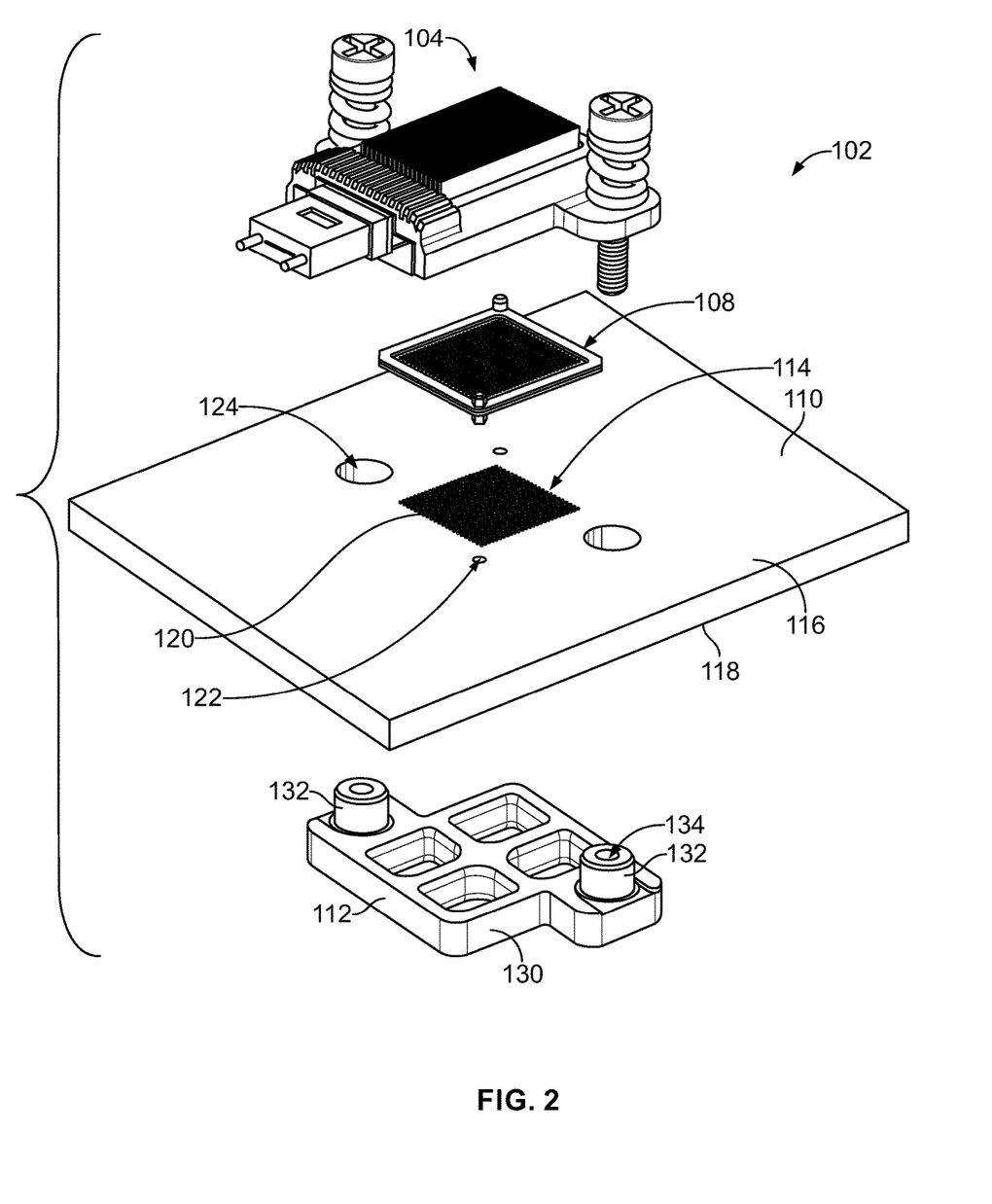
FIG. 2 is an exploded, rear perspective view of the optoelectronic assembly in accordance with an exemplary embodiment.
Figure 3:
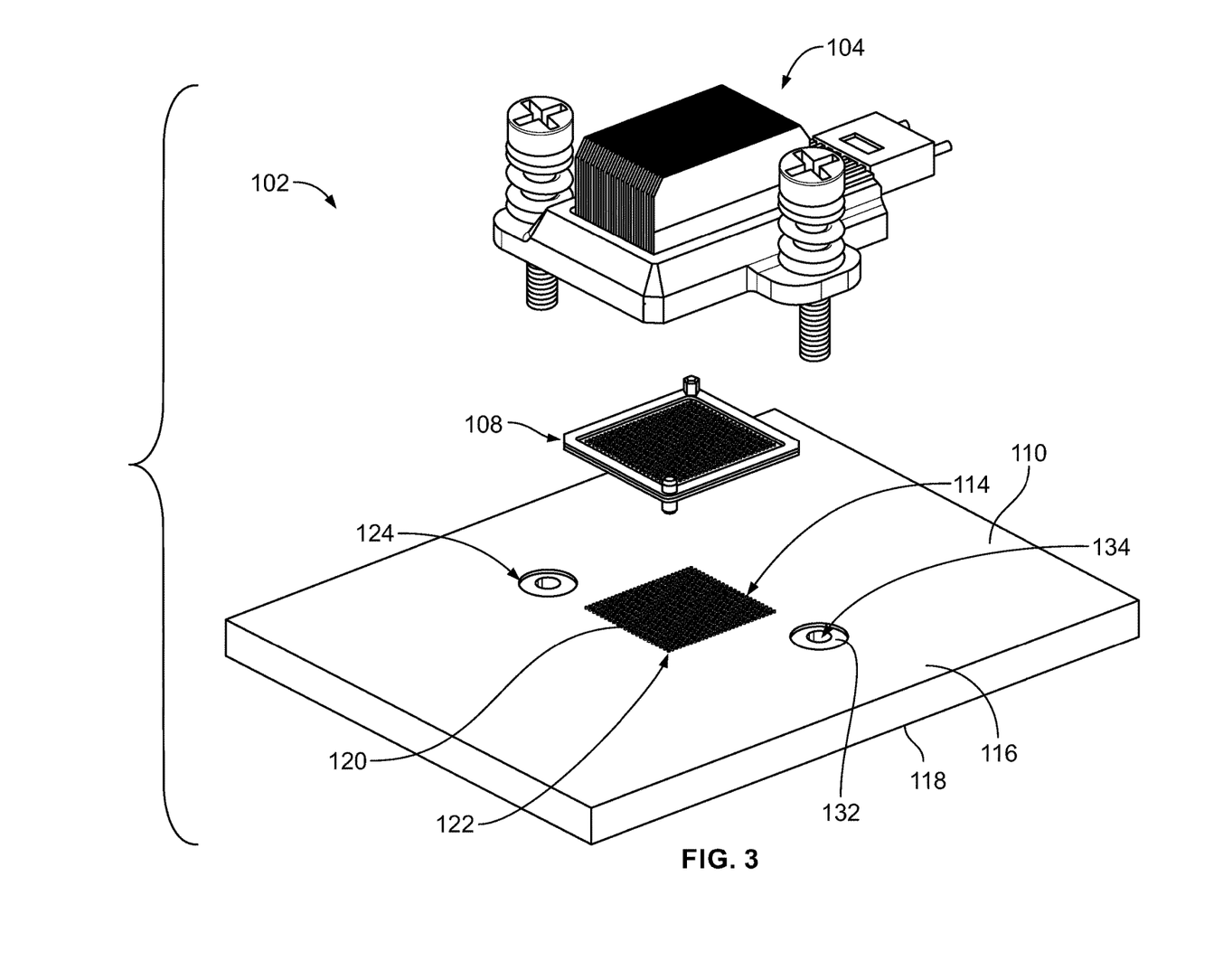
FIG. 3 is an exploded, front perspective view of the optoelectronic assembly in accordance with an exemplary embodiment.

FIG. 2 is an exploded, rear perspective view of the optoelectronic assembly 102 in accordance with an exemplary embodiment. FIG. 3 is an exploded, front perspective view of the optoelectronic assembly 102 in accordance with an exemplary embodiment. The optoelectronic assembly 102 includes the optical module assembly 104 and the interposer assembly 108. The interposer assembly 108 is used to electrically connect the optical module assembly 104 to the circuit board 110. The optoelectronic assembly 102 includes a bolster plate 112 used to secure the optical module assembly 104 to the circuit board 110.

The circuit board 110 includes a mounting area 114 on an upper surface 116 of the circuit board 110. The mounting area 114 may be located adjacent the electronic package 106 (shown in FIG. 1). The circuit board 110 includes board contacts 120 at the mounting area 114. The board contacts 120 are arranged in an array, such as in rows and columns. The board contacts 120 may be pads or traces of the circuit board 110. The board contacts 120 may be high speed signal contacts, sideband signal contacts, ground contacts, or power contacts. In an exemplary embodiment, the circuit board 110 includes alignment openings 122 adjacent the mounting area 114. The interposer assembly 108 is coupled to the alignment openings 122 to orient the interposer assembly 108 relative to the circuit board 110. The alignment openings 122 may be keyed, such as being differently sized, to orient the interposer assembly 108 relative to the circuit board 110. In an exemplary embodiment, the circuit board includes mounting openings 124 adjacent the mounting area 114. The optical module assembly 104 and/or the bolster plate 112 is coupled to the circuit board 110 at the mounting openings 124.

The bolster plate 112 is configured to be coupled to a lower surface 118 of the circuit board 110. The bolster plate 112 includes a main body 130 and embossments 132 extending from a top of the main body 130. The embossments 132 are received in the mounting openings 124. In the illustrated embodiment, the embossments 132 are cylindrical. The embossments 132 may have other shapes in alternative embodiments. The embossments 132 may have different sizes or different shapes for keyed mating with the circuit board 110. In an exemplary embodiment, the embossments 132 have bores 134 extending therethrough. The bores 134 may be threaded to receive threaded fasteners of the optical module assembly 104.

Figure 4:
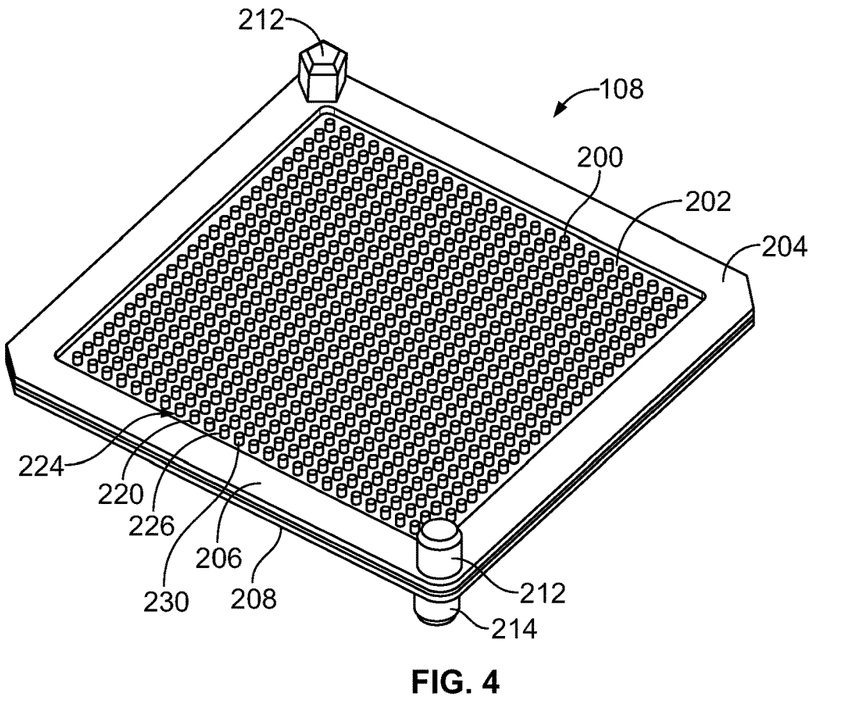
FIG. 4 is a top perspective view of the interposer assembly in accordance with an exemplary embodiment.
Figure 5:
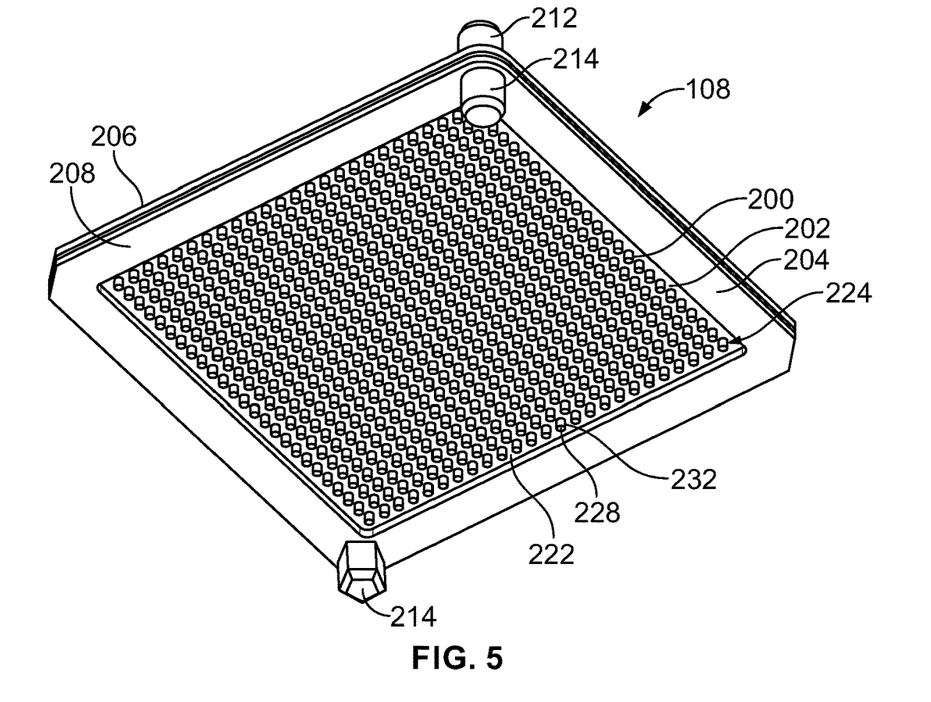
FIG. 5 is a bottom perspective view of the interposer assembly in accordance with an exemplary embodiment.

FIG. 4 is a top perspective view of the interposer assembly 108 in accordance with an exemplary embodiment. FIG. 5 is a bottom perspective view of the interposer assembly 108 in accordance with an exemplary embodiment. The interposer assembly 108 includes an array of interposer contacts 200 held together by a support plate 202. The interposer assembly 108 includes an interposer frame 204 holding the support plate 202 and the interposer contacts 200.

In an exemplary embodiment, the interposer frame 204 is a multipiece frame having an upper frame member 206 and a lower frame member 208. The support plate 202 is sandwiched between the upper frame member 206 and the lower frame member 208. In the illustrated embodiment, the interposer frame 204 extends around an outer periphery of the interposer assembly 108, such as along all four sides of the support plate 202. The interposer frame 204 may have other shapes in alternative embodiments.

In an exemplary embodiment, the interposer frame 204 includes upper locating pins 212 and lower locating pins 214. The upper locating pins 212 extend upward from the upper frame member 206. The upper locating pins 212 are used for locating the optical module assembly 104 (shown in FIG. 2) relative to the interposer assembly 108. The upper locating pins 212 are received in alignment features, such as openings, of the optical module assembly 104 to position the optical module assembly 104 relative to the interposer frame 204 and the interposer contacts 200. The upper locating pins 212 may be held in the optical module assembly 104 by an interference fit. Optionally, the upper locating pins 212 may be different sizes or shapes for keyed mating with the optical module assembly 104. The lower locating pins 214 extend downward from the lower frame member 208. The lower locating pins 214 are used for locating the interposer assembly 108 relative to the circuit board 110 (shown in FIG. 2). The lower locating pins 214 are received in the alignment openings 122 to position the interposer frame 204 and the interposer contacts 200 relative to the circuit board 110. Other types of locating features other than the locating pins 212, 214 may be used in alternative embodiments. The lower locating pins 214 may be held in the alignment openings 122 by an interference fit. Optionally, the lower locating pins 214 may be different sizes or shapes for keyed mating with the alignment openings 122.

In an exemplary embodiment, the support plate 202 is a film having an upper surface 220 and a lower surface 222. The support plate 202 includes openings 224 therethrough holding corresponding interposer contacts 200. The support plate 202 is manufactured from an insulative material, such as a polyimide material, to electrically isolate the interposer contacts 200 from one another.

The interposer contacts 200 are held by the support plate 202. In an exemplary embodiment, the interposer contacts 200 are compressible contacts, such as conductive polymer columns. Each interposer contact 200 includes an upper mating interface 226 and a lower mating interface 228. The upper mating interface 226 is located above the upper surface 220 of the support plate 202 and the lower mating interface 228 is located below the lower surface 222 of the support plate 202. The interposer contacts 200 are compressible between the upper mating interfaces 226 and the lower mating interfaces 228. Optionally, the upper and lower mating interfaces 226, 228 may be planar interfaces oriented parallel to each other. Optionally, upper and lower sides 230, 232 of the interposer contacts 200 may be tapered. For example, the sides 230, 232 may be oriented nonparallel to the upper and lower mating interfaces 226, 228. The upper and lower portions of the interposer contacts 200 may be cone-shaped, such as being frusto-conical. Other types of interposer contacts 200 may be utilized in alternative embodiments.

Figure 6:
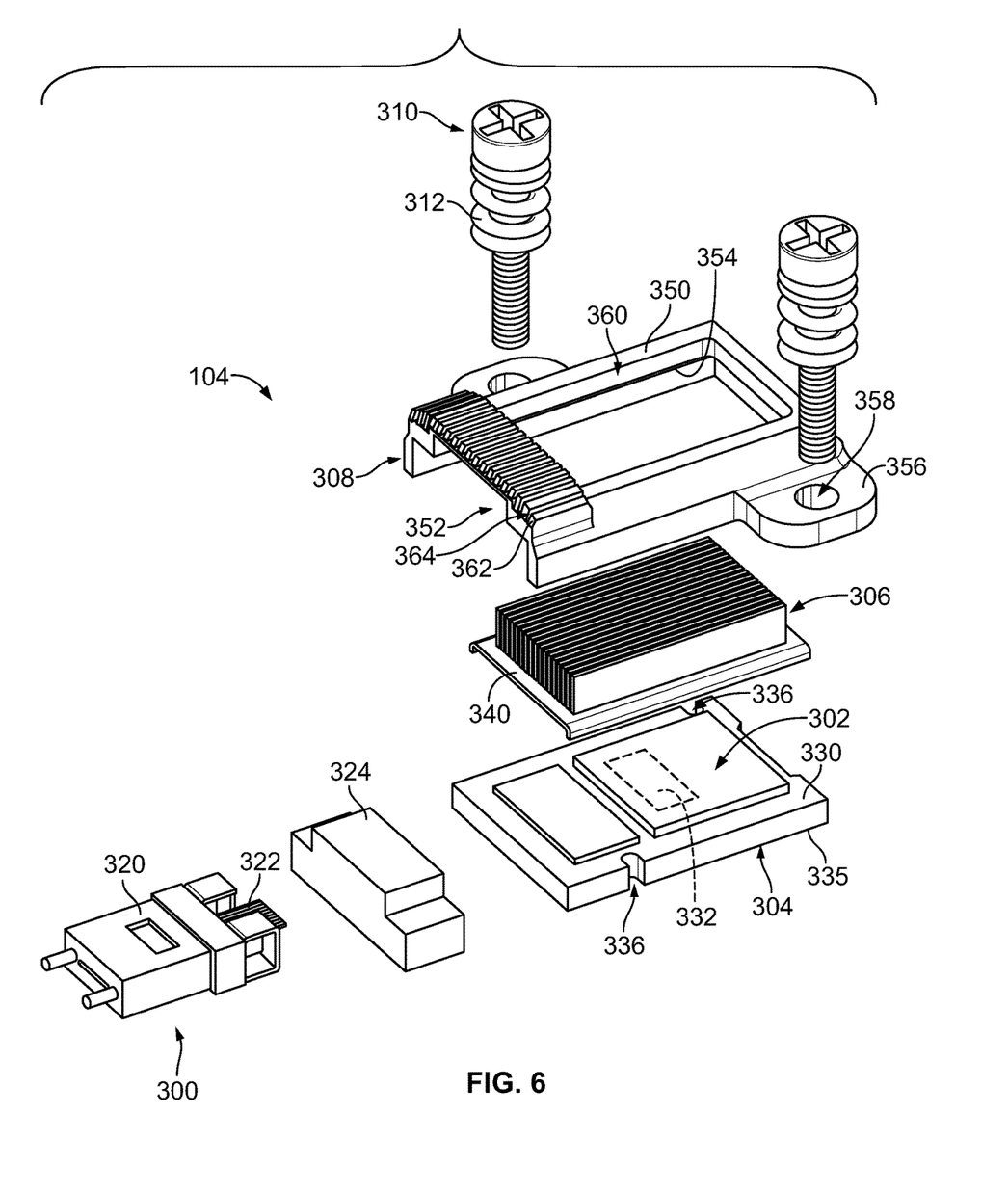
FIG. 6 is an exploded view of the optical module assembly in accordance with an exemplary embodiment.

FIG. 6 is an exploded view of the optical module assembly 104 in accordance with an exemplary embodiment. The optical module assembly 104 includes a fiber optic connector 300, an optical engine 302 on an optical engine substrate 304, a heat transfer element 306 thermally coupled to the optical engine 302, and a backshell 308 that holds the other components together. The backshell 308 is configured to be coupled to the circuit board 110 (shown in FIG. 2) using mounting hardware 310. In an exemplary embodiment, the mounting hardware 310 is compression hardware having biasing elements 312, such as springs, coupled to the mounting hardware 310. The mounting hardware 310 is configured to be threadably coupled to the bolster plate 112 (shown in FIG. 2).

The fiber optic connector 300 includes a ferrule 320 holding at least one optical fiber 322. The fiber optic connector 300 is configured to be coupled to the optical engine 302 such that the optical fibers 322 are optically coupled to the optical engine 302. In an exemplary embodiment, the fiber optic connector 300 includes a fiber strain relief element 324. The fiber strain relief element 324 provides strain relief for the optical fibers 322. The fiber strain relief element 324 may be overmolded over the optical fibers 322.

The optical engine 302 is coupled to the optical engine substrate 304, such as at a top 330 of the optical engine substrate 304. The optical engine 302 includes an optical-electrical converter 332 for converting between optical signals and electrical signals. In an exemplary embodiment, the optical engine substrate 304 includes a contact array of optical engine contacts 334 (shown in FIG. 8) at a bottom 335 of the optical engine substrate 304. The optical engine contacts 334 are coupled to the optical engine 302. The optical engine contacts 334 are configured to be coupled to the interposer contacts 200 (shown in FIG. 4). The optical engine contacts 334 may define a separable mating interface with the interposer assembly 108. In an exemplary embodiment, the optical engine substrate 304 includes alignment features 336 configured to align the optical engine substrate 304 with the interposer assembly 108. For example, the alignment features 336 may be openings through the optical engine substrate 304. The alignment features 336 receive the upper locating pins 212 (shown in FIG. 4) to orient the optical engine substrate 304 with the interposer assembly 108. The alignment features 336 may have different sizes for keyed mating with the upper locating pins 212.

The heat transfer element 306 is configured to be thermally coupled to the optical engine 302 to dissipate heat from the optical engine 302. In an exemplary embodiment, the heat transfer element 306 includes a thermal bridge. The heat transfer element 306 includes a stack of plates being individually movable relative to each other to conform to the optical engine 302. The plates are held together in a frame 340. In an exemplary embodiment, the heat transfer element 306 may be a heat sink configured to be air cooled. For example, the heat transfer element 306 may include heat dissipating fins having airflow channels between the heat dissipating fins. In other various embodiments, the heat transfer element 306 may be thermally coupled to another component, such as a liquid cooling module or another heat sink.

In an exemplary embodiment, the backshell 308 is manufactured from a metal material. Optionally, the backshell 308 may be diecast. The backshell 308 includes a main body 350 forming a cavity 352. The backshell 308 has an opening 360 at a top of the backshell 308. The main body 350 surrounds the opening 360. The cavity 352 receives the heat transfer element 306, the optical engine 302, the optical engine substrate 304 and the fiber optic connector 300. In an exemplary embodiment, the backshell 308 includes a ledge 354 surrounding the cavity 352. The ledge 354 captures the heat transfer element 306 and/or the optical engine substrate 304. The ledge 354 may press downward against the heat transfer element 306 and/or the optical engine substrate 304. The backshell 308 includes mounting tabs 356 having openings 358. The mounting tabs 356 may be mounted to the circuit board 110. The openings 358 receive the mounting hardware 310. The biasing elements 312 are coupled to the mounting tabs 356 and press downward against the mounting tabs 356 to hold the heat transfer element 306 in thermal contact with the optical engine 302. The biasing elements 312 press downward against the mounting tabs 356 to compress the interposer contacts 200. In an exemplary embodiment, the backshell 308 includes heat dissipating fins 362 having airflow channels 364 therebetween. The heat dissipating fins 360 dissipate heat from the backshell 308.

Figure 7:
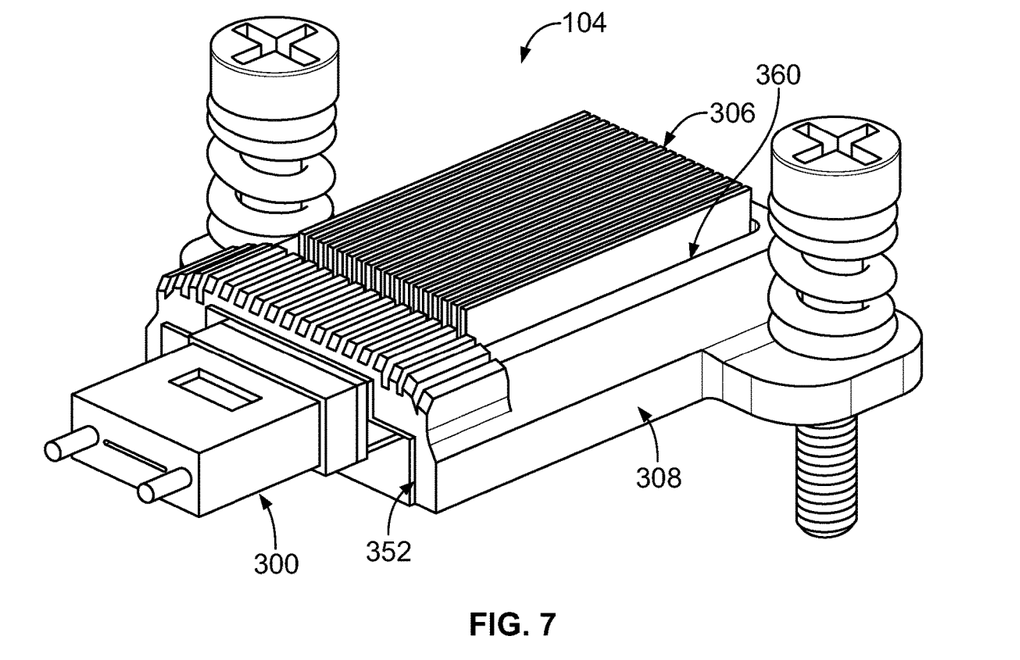
FIG. 7 is a top perspective view of the optical module assembly in accordance with an exemplary embodiment.
Figure 8:
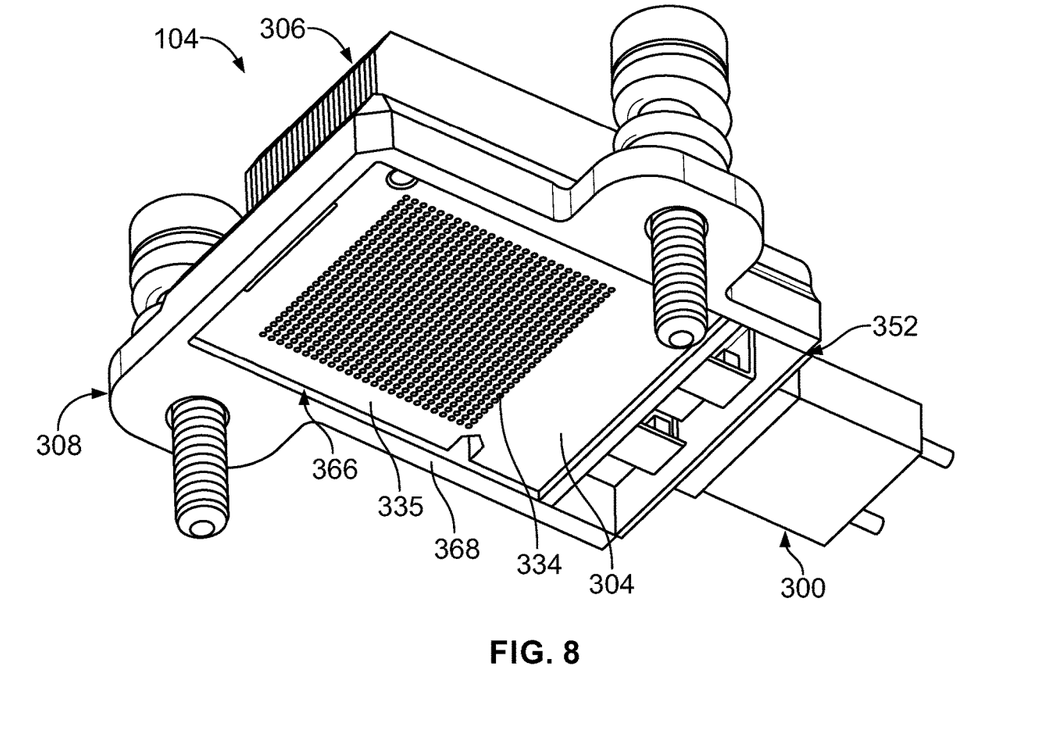
FIG. 8 is a bottom perspective view of the optical module assembly in accordance with an exemplary embodiment.

FIG. 7 is a top perspective view of the optical module assembly 104 in accordance with an exemplary embodiment. FIG. 8 is a bottom perspective view of the optical module assembly 104 in accordance with an exemplary embodiment. FIGS. 7 and 8 illustrate the optical module assembly 104 in an assembled state. The heat transfer element 306, the optical engine 302, the optical engine substrate 304 and the fiber optic connector 300 are received in the cavity 352 of the backshell 308. The fiber optic connector 300 extends from the backshell 308. The heat transfer element 306 extends through the opening 360 to an exterior of the backshell 308.

In an exemplary embodiment, the backshell 308 includes an opening 366 at a bottom 368 of the backshell 308. The optical engine substrate 304 is exposed at the bottom 368 for interfacing with the interposer assembly 108 (shown in FIG. 4). The optical engine contacts 334 are provided at the bottom 335 of the optical engine substrate 304. The optical engine contacts 334 may be pads or traces of the optical engine substrate 304. The optical engine contacts 334 are arranged in an array, such as in rows and columns. The optical engine contacts 334 may be high speed signal contacts, sideband signal contacts, ground contacts, and power contacts. In an exemplary embodiment, a bottom portion of the cavity 352 is configured to receive the interposer assembly 108 to mate with the optical engine contacts 334.

Figure 9:
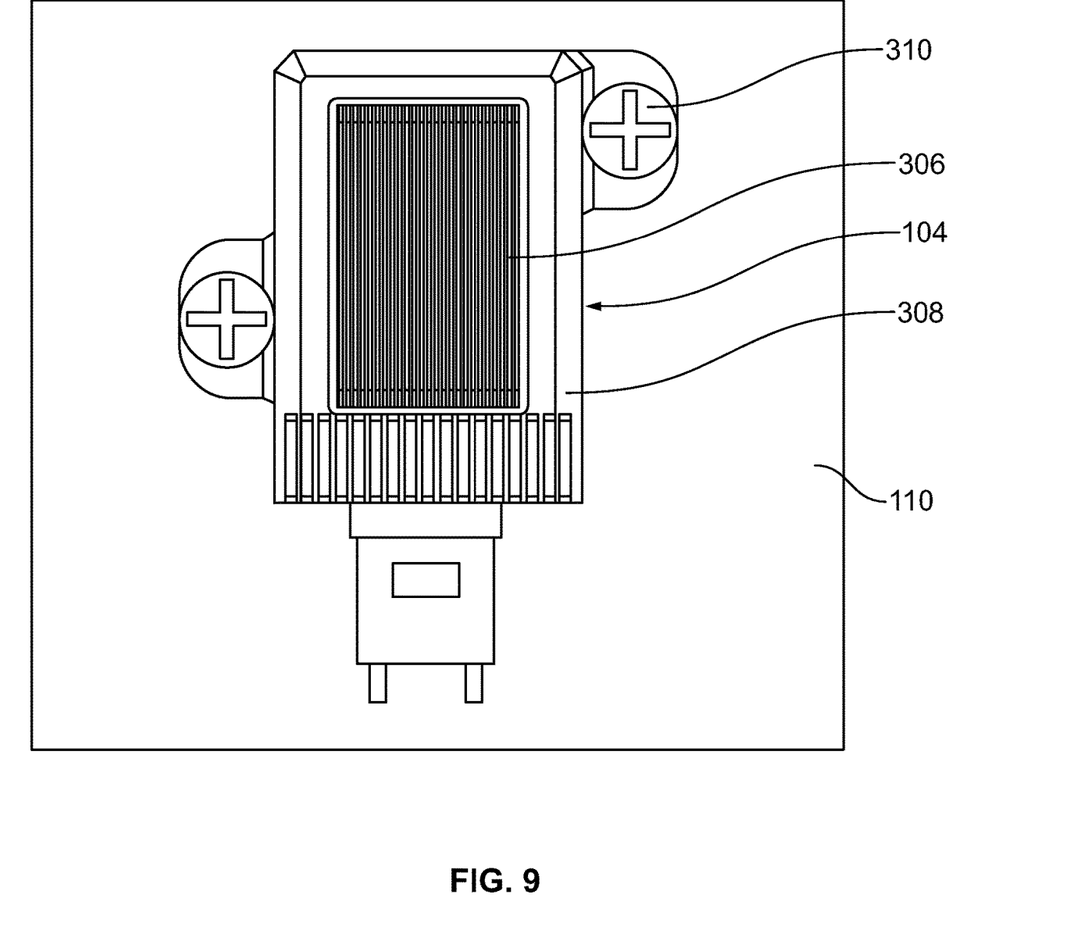
FIG. 9 is a top view of the optical module assembly coupled to the circuit board in accordance with an exemplary embodiment.
Figure 10:
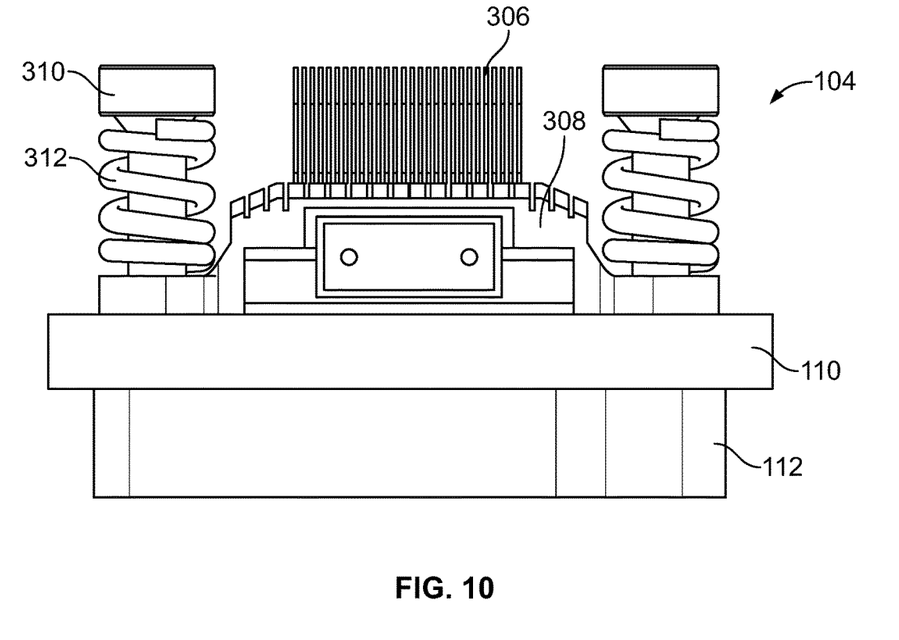
FIG. 10 is an end view of the optical module assembly coupled to the circuit board in accordance with an exemplary embodiment.
Figure 11:
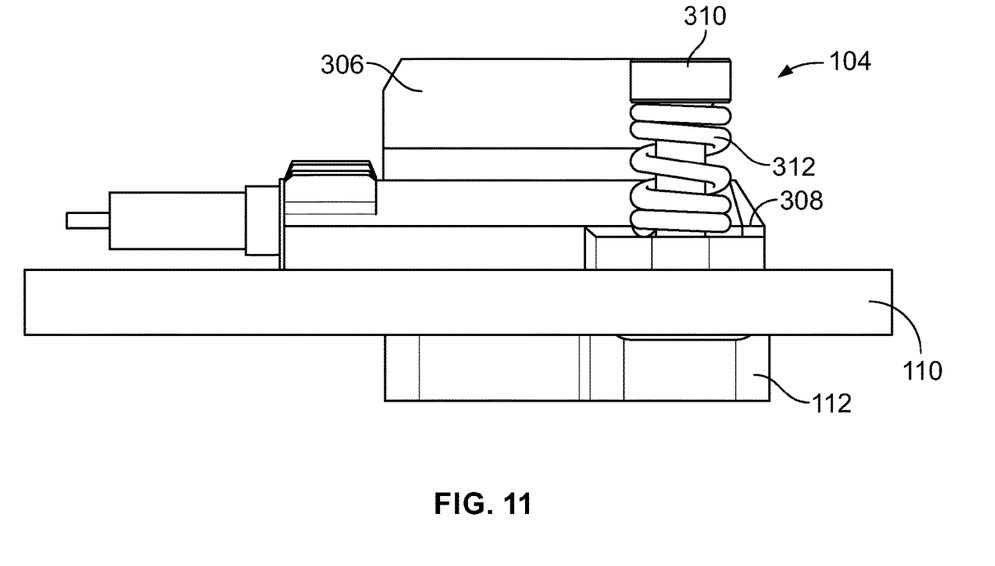
FIG. 11 is a side view of the optical module assembly coupled to the circuit board in accordance with an exemplary embodiment.

FIG. 9 is a top view of the optical module assembly 104 coupled to the circuit board 110. FIG. 10 is an end view of the optical module assembly 104 coupled to the circuit board 110. FIG. 11 is a side view of the optical module assembly 104 coupled to the circuit board 110. The bolster plate 112 is located below the circuit board 110. The optical module assembly 104 is coupled to the top of the circuit board 110. The mounting hardware 310 passes through the circuit board 110 to threadably couple to the bolster plate 112. The biasing elements 312 are compressed as the mounting hardware is tightened. The biasing elements 312 press downward against the backshell 308 to press the backshell 308 downward toward the circuit board 110. The biasing elements 312 press the backshell 308 downward against the heat transfer element 306 to press the heat transfer element 306 against the optical engine 302. In an exemplary embodiment, the biasing elements 312 press the backshell 308 downward to compress the interposer contacts 200 (shown in FIG. 4).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An optoelectronic assembly comprising:
an optical module assembly including a fiber optic connector and an optical engine on an optical engine substrate, the fiber optic connector having a ferrule holding at least one optical fiber optically coupled to the optical engine, the optical engine substrate including a contact array of optical engine contacts at a bottom of the optical engine substrate, the optical engine contacts being coupled to the optical engine, the optical module assembly including a heat transfer element thermally coupled to the optical engine, the optical module assembly including a backshell configured to be coupled to a circuit board, the backshell including a cavity holding the heat transfer element, the optical engine and the optical engine substrate, the backshell holding the heat transfer element in thermal contact with the optical engine; and
an interposer assembly electrically connected to the contact array of optical engine contacts, the interposer assembly including an array of interposer contacts, the interposer contacts being compressible, each interposer contact having an upper mating interface and a lower mating interface, the upper mating interfaces defining separable mating interfaces electrically connected to the corresponding optical engine contacts, the lower mating interfaces of the interposer contacts are configured to be electrically connected to the circuit board.

2. The optoelectronic assembly of claim 1, wherein the backshell compresses the interposer contacts when the backshell is coupled to the circuit board.

3. The optoelectronic assembly of claim 1, wherein the optical module assembly includes compression hardware configured to be coupled to the circuit board, the compression hardware including biasing elements pressing the backshell downward toward the circuit board.

4. The optoelectronic assembly of claim 3, wherein the biasing elements press the backshell downward against the heat transfer element to press the heat transfer element against the optical engine.

5. The optoelectronic assembly of claim 1, wherein the heat transfer elements include a thermal interface engaging an upper surface of the optical engine.

6. The optoelectronic assembly of claim 1, wherein the optical engine substrate includes alignment features, the interposer assembly including alignment features interfacing with the alignment features of the optical engine substrate to orient the optical engine contacts with the interposer contacts.

7. The optoelectronic assembly of claim 1, wherein the optical engine includes an optical-electrical converter.

8. The optoelectronic assembly of claim 1, wherein the optical module assembly further comprises a fiber strain relief member providing strain relief for the at least one optical fiber, the fiber strain relief member received in the cavity and coupled to the optical engine substrate.

9. The optoelectronic assembly of claim 1, wherein the interposer assembly includes an interposer frame received in the cavity, the interposer frame being coupled to the optical engine substrate.

10. The optoelectronic assembly of claim 9, wherein the interposer frame includes locating pins, the optical engine substrate including alignment openings receiving the locating pins to orient the interposer assembly with respect to the optical engine substrate.

11. The optoelectronic assembly of claim 1, further comprising a bolster plate configured to be coupled to a lower surface of the circuit board, the backshell being coupled to the bolster plate using mounting hardware, the circuit board being captured between the bolster plate and the backshell.

12. The optoelectronic assembly of claim 1, wherein the heat transfer element includes a thermal bridge having a plurality of plates arranged in a plate stack, the plates being independently movable to conform to the optical engine.

13. The optoelectronic assembly of claim 1, wherein the heat transfer element includes heat transfer fins having airflow channels therebetween.

14. The optoelectronic assembly of claim 1, wherein the backshell includes heat transfer fins extending from an exterior surface of the backshell, the heat transfer fins having airflow channels therebetween.

15. An optoelectronic assembly comprising:
a circuit board having board contacts at a mounting area on an upper surface of the circuit board, the mounting area having alignment openings;
an interposer assembly coupled to the circuit board at the mounting area, the interposer assembly including an array of interposer contacts held together by a support plate, the support plate and the interposer contacts being held by an interposer frame, the interposer frame including locating pins received in the alignment openings to align the interposer assembly with the circuit board, the interposer contacts being compressible, each interposer contact having an upper mating interface and a lower mating interface, the upper mating interfaces defining separable mating interfaces, the lower mating interfaces of the interposer contacts being electrically connected to the corresponding board contacts of the circuit board; and
an optical module assembly coupled to the interposer assembly, the optical module assembly including a fiber optic connector and an optical engine on an optical engine substrate, the fiber optic connector having a ferrule holding at least one optical fiber optically coupled to the optical engine, the optical engine substrate including a contact array of optical engine contacts at a bottom of the optical engine substrate, the optical engine contacts being coupled to the optical engine, the optical engine contacts being coupled to the corresponding interposer contacts at a separable mating interface, the optical module assembly including a heat transfer element thermally coupled to the optical engine, the optical module assembly including a backshell coupled to the circuit board, the backshell including a cavity holding the heat transfer element, the optical engine and the optical engine substrate, the backshell holding the heat transfer element in thermal contact with the optical engine.

16. The optoelectronic assembly of claim 15, wherein the optical module assembly includes compression hardware configured to be coupled to the circuit board, the compression hardware including biasing elements pressing the backshell downward toward the circuit board, the biasing elements pressing the backshell downward against the heat transfer element to press the heat transfer element against the optical engine.

17. The optoelectronic assembly of claim 15, wherein the optical engine substrate includes alignment features, the interposer assembly including alignment features interfacing with the alignment features of the optical engine substrate to orient the optical engine contacts with the interposer contacts.

18. A communication system comprising:
a circuit board having an electronic package on the circuit board, the electronic package being electrically connected to the circuit board, the circuit board having mounting areas on an upper surface of the circuit board adjacent the electronic package, each mounting area including board contacts, the mounting area having alignment openings, the mounting area having mounting openings;
interposer assemblies coupled to the circuit board at the corresponding mounting areas, each interposer assembly including an array of interposer contacts held together by a support plate, the support plate and the interposer contacts being held by an interposer frame, the interposer frame including locating pins received in the alignment openings to align the interposer assembly with the circuit board, the interposer contacts being compressible, each interposer contact having an upper mating interface and a lower mating interface, the upper mating interfaces defining separable mating interfaces, the lower mating interfaces of the interposer contacts being electrically connected to the corresponding board contacts of the circuit board; and
optical module assemblies coupled to the corresponding interposer assemblies, each optical module assembly including a fiber optic connector and an optical engine on an optical engine substrate, the fiber optic connector having a ferrule holding at least one optical fiber optically coupled to the optical engine, the optical engine substrate including a contact array of optical engine contacts at a bottom of the optical engine substrate, the optical engine contacts being coupled to the optical engine, the optical engine contacts being coupled to the corresponding interposer contacts at a separable mating interface, the optical module assembly including a heat transfer element thermally coupled to the optical engine, the optical module assembly including a backshell coupled to the circuit board using compression hardware received in the corresponding mounting openings, the backshell including a cavity holding the heat transfer element, the optical engine and the optical engine substrate, the backshell holding the heat transfer element in thermal contact with the optical engine.

19. The communication system of claim 18, wherein the mounting areas surround the electronic package on multiple sides to position the interposer assemblies and the optical module assemblies on multiple sides of the electronic package.

20. The communication system of claim 18, further comprising a bolster plate coupled to a lower surface of the circuit board, the backshell being coupled to the bolster plate using mounting hardware, the circuit board being captured between the bolster plate and the backshell.

* * * * *